US012781898B2

(12) United States Patent
Oh et al.

(10) Patent No.: US 12,781,898 B2
(45) Date of Patent: Nov. 3, 2026

(54) PIPE CONNECTOR

(71) Applicants: Hanon Systems, Daejeon (KR); HWAYOUNG CO., LTD., Busan (KR)

(72) Inventors: Seung Kyu Oh, Daejeon (KR); Jong Su Kim, Daejeon (KR); Jin Uk Kim, Daejeon (KR); Sang Chul Byon, Daejeon (KR); Kil Sang Yoon, Daejeon (KR); Young Wook Cho, Daejeon (KR); Sung Been Cheon, Daejeon (KR); Su Jin An, Gyeongsangnam-do (KR); Dong Young Kim, Gyeongsangnam-do (KR)

(73) Assignees: HANON SYSTEMS, Daejeon (KR); HWAYOUNG CO., LTD., Busan (KR)

(*) Notice: Subject to any disclaimer, the term of this patent is extended or adjusted under 35 U.S.C. 154(b) by 0 days.

(21) Appl. No.: 19/104,175

(22) PCT Filed: Oct. 6, 2023

(86) PCT No.: PCT/KR2023/015433
§ 371 (c)(1),
(2) Date: Feb. 14, 2025

(87) PCT Pub. No.: WO2024/080678
PCT Pub. Date: Apr. 18, 2024

(65) Prior Publication Data
US 2026/0055836 A1 Feb. 26, 2026

(30) Foreign Application Priority Data
Oct. 11, 2022 (KR) ........................ 10-2022-0129924
Oct. 11, 2022 (KR) ........................ 10-2022-0129967

(51) Int. Cl.
*F16L 37/12* (2006.01)

(52) U.S. Cl.
CPC .................................... *F16L 37/12* (2013.01)

(58) Field of Classification Search
CPC ......... F16L 25/12; F16L 37/12; F16L 37/123; F16L 37/1225; F16L 37/084;
(Continued)

(56) References Cited

U.S. PATENT DOCUMENTS 7,866,711 B2 * 1/2011 Kerin .................... F16L 37/144 285/308
2008/0111374 A1 5/2008 Pedersen et al.
(Continued)

FOREIGN PATENT DOCUMENTS

CN 110234921 9/2019
JP 2018196159 12/2018
(Continued)

OTHER PUBLICATIONS

International Search Report and Written Opinion issued on Jan. 5, 2024 for corresponding application No. PCT/KR2023/015433.
(Continued)

*Primary Examiner* — Aaron M Dunwoody
(74) *Attorney, Agent, or Firm* — NORTON ROSE FULBRIGHT US LLP

(57) ABSTRACT

The present invention describes a pipe connector that includes a female connector, male connectors which are coupled to both sides of the female connector, respectively, each having beads protruding from the outer surface thereof, and locking members which, when the male connectors are coupled thereto in a state where the locking members are temporarily coupled to chamber portions formed at both sides of the female connector, each move on the chamber portion with the beads locked onto surface thereof. The locking members are made of a synthetic resin material, and a reinforcement plate made of a metal material is coupled to
(Continued)

the one surface of each of the locking members, onto which the beads are locked.

19 Claims, 8 Drawing Sheets

(58) Field of Classification Search
CPC ... F16L 37/0841; F16L 37/008; F16L 41/021; F16L 41/023; F16L 41/03
See application file for complete search history.

(56) References Cited

U.S. PATENT DOCUMENTS

| | | | | |
|---|---|---|---|---|
| 2016/0281894 | A1 | 9/2016 | Freter | |
| 2016/0305589 | A1* | 10/2016 | Wildfang | E03C 1/025 |

FOREIGN PATENT DOCUMENTS

| | | |
|---|---|---|
| JP | 2019056448 | 4/2019 |
| KR | 1020040015691 | 2/2004 |

OTHER PUBLICATIONS

Translation of Official Action issued Jun. 29, 2026 in related Korean Patent Application No. KR 1020220129967, 14 pgs.

* cited by examiner

[FIG. 1]
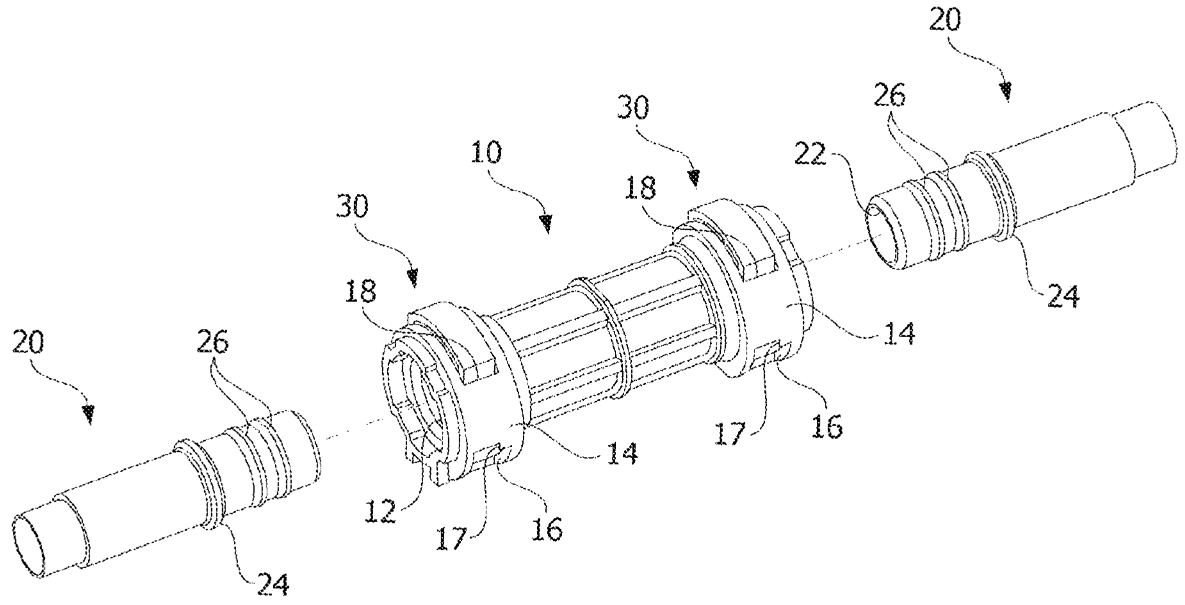

[FIG. 2]
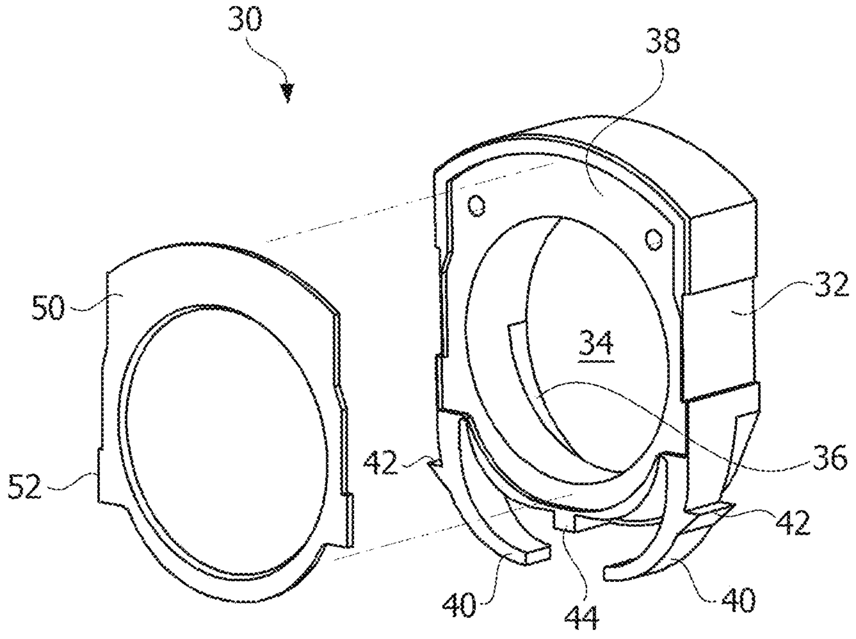

[FIG. 3]
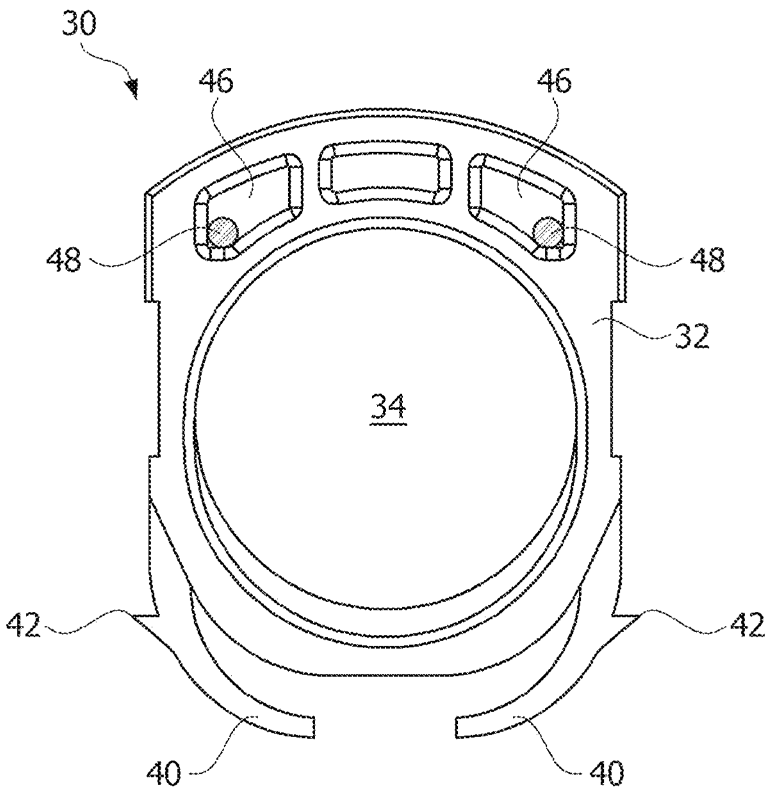

[FIG. 4]
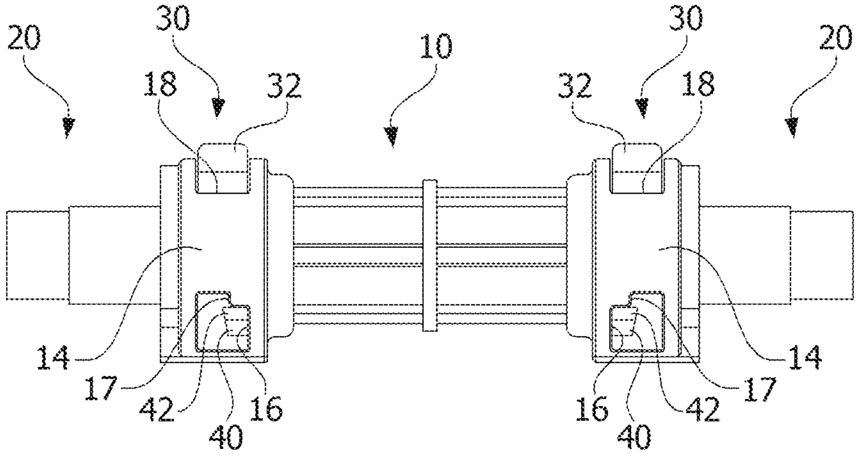

[FIG. 5]
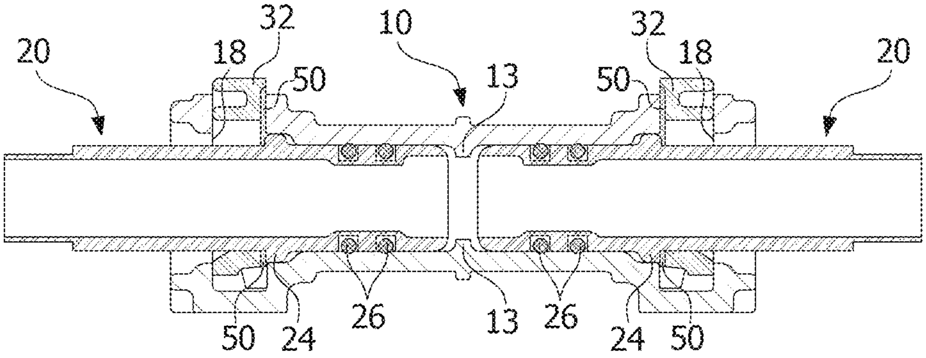

[FIG. 6]
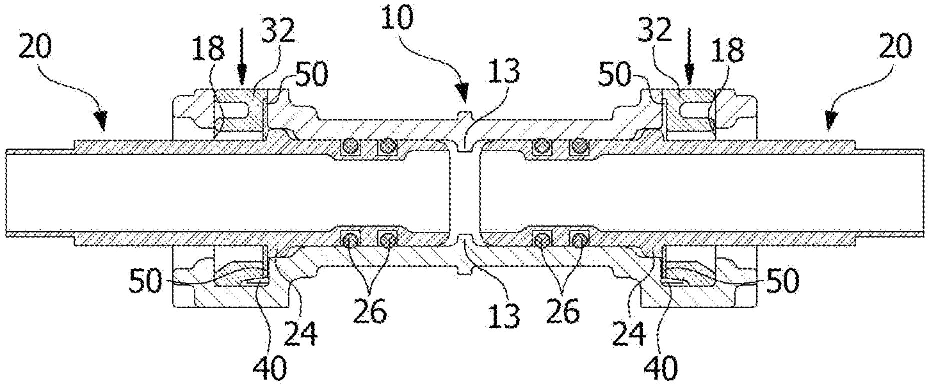

[FIG. 7]
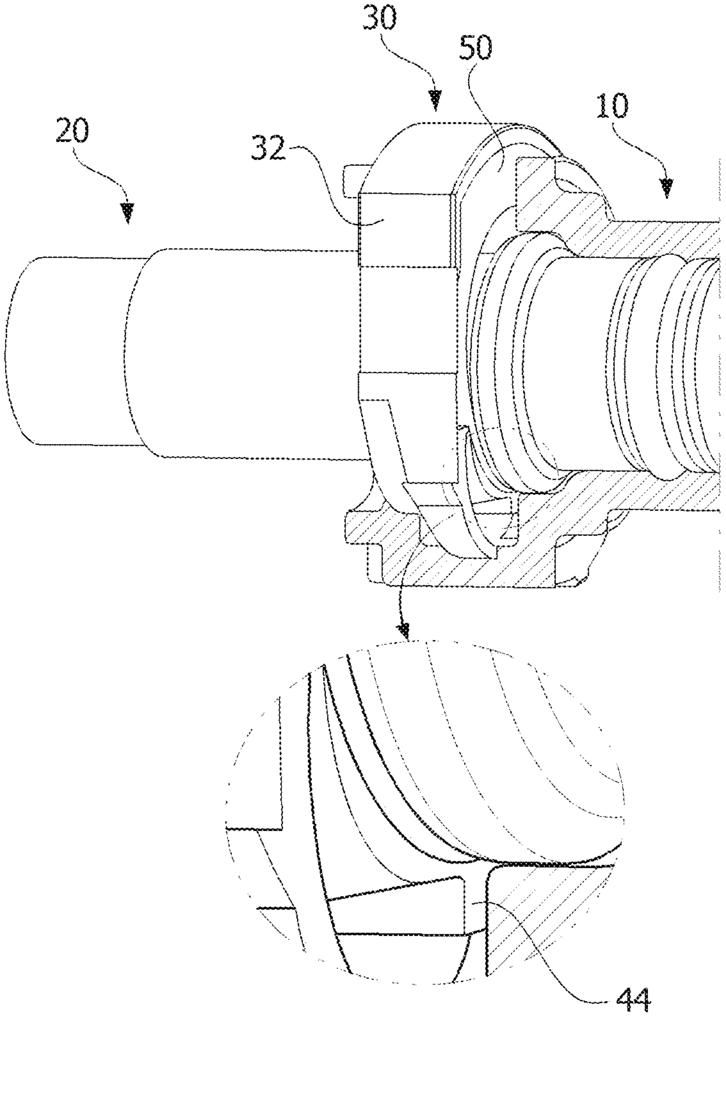

[FIG. 8]
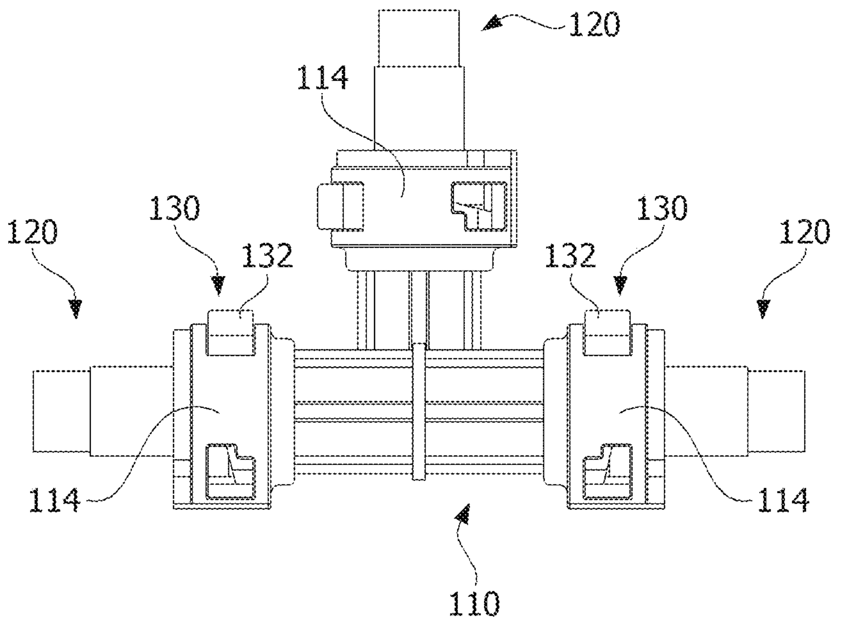

PIPE CONNECTOR

CROSS REFERENCE TO RELATED APPLICATIONS

The present application is a national phase application under 35 U.S.C. § 371 of International Application No. PCT/KR2023/015433, filed Oct. 6, 2023, which claims the benefit of priority to Korean Patent Application No. 10-2022-0129924, filed Oct. 11, 2022, and Korean Patent Application No. 10-2022-0129967, filed Oct. 11, 2022, each of which are incorporated herein by reference in their entirety.

TECHNICAL FIELD

The present invention relates to a pipe connector.

BACKGROUND ART

A general cooling system is composed of an evaporator, which absorbs heat from the surroundings, a compressor which compresses a refrigerant, a condenser which releases heat to the surroundings, and an expansion valve which expands the refrigerant.

In the cooling system, a gaseous refrigerant flowing from the evaporator to the compressor is compressed in the compressor at a high temperature and high pressure, and in a process in which the compressed gaseous refrigerant is liquefied by passing through the condenser, the heat of liquefaction is released to the surroundings. Then, the liquefied refrigerant passes through the expansion valve to become a low-temperature and low-pressure wet saturated vapor, and then is introduced into the evaporator. In the evaporator, the low-temperature and low-pressure wet saturated vapor evaporates, absorbing the heat of liquefaction from the surroundings, and thus cooling the surrounding air, thereby completing one cooling cycle.

In the cooling system, various types of pipes are used for the flow of refrigerant, and various connectors are used to connect the pipes. A conventional connector is formed by coupling a female connector and a male connector. Separate processing, such as swaging or heat welding, is required on an end of the female connector to couple the female connector and the male connector. Since an O-ring is provided on the female connector, separate components, such as a spacer and a retainer, are needed to secure the O-ring.

DISCLOSURE

Technical Problem

The present invention is directed to providing a pipe connector which allows the man-hours for connection and separation between a female connector and male connectors, which constitute a connector, to be reduced and pipes to be easily connected by connecting the male connectors with both sides of the female connector.

Also, the present invention is directed to providing a pipe connector which does not need a separate component to fix the O-ring in the female connector by having O-rings in the male connectors, thereby reducing the number of components and lowering costs.

Also, the present invention is directed to providing a pipe connector which has a structure which prevents damage to a coupling portion caused by external force while the connector is coupled.

Also, the present invention is directed to providing a pipe connector with the improved assembly efficiency of products by allowing a locking member to be easily connected or separated.

Technical Solution

One aspect of the present invention provides a pipe connector which includes a female connector, male connectors connected to both sides of the female connector and having beads protruding from outer circumferential surfaces thereof, and locking members which allow the beads to be caught on one surfaces thereof by moving on chamber portions when the male connectors are coupled while the chamber portions formed on both sides of the female connector are pre-coupled to both sides of the female connector, wherein the locking member is formed of a synthetic material, and a metal reinforcement plate is coupled to the one surface of the locking member on which the bead is caught.

The locking members may provide an elastic force in a direction perpendicular to an axial direction of the female connector while the beads are caught.

The locking member may include a locking body having a through hole through which the male connector passes, and elastic parts protruding from a lower portion of the locking body and providing the elastic force while in contact with an inner circumferential surface of the female connector.

The elastic parts may extend downward from both sides of the lower portion of the locking body and have a leg shape having front ends extending and curved to face each other.

The reinforcement plate may be mounted in a mounting groove formed by recessing one surface of the locking body.

The reinforcement plate may be integrally formed with the locking body through insert molding.

The locking body may include a reduction portion, and the reduction portion may include a compressing hole for compressing during insert molding.

The locking body may include a locking protrusion on which the bead is caught.

Hooks may protrude from both sides of the elastic parts and may be caught by fastening protrusions formed on both sides of the female connector.

A guide surface, on which the bead may slide when the male connector is coupled, may be obliquely formed inside the locking body.

The guide surface may be obliquely formed upward from a front side toward a rear side of the locking body.

The fastening protrusions, on which ends of the male connectors are caught when the male connectors are coupled, may be provided in an axial hole of the female connector.

Another aspect of the present invention provides a pipe connector which includes a female connector, male connectors coupled to both sides of the female connector and having beads protruding from outer circumferential surfaces thereof, and locking members which allow the beads to be caught on one surfaces thereof by moving on chamber portions when the male connectors are coupled while pre-coupled to the chamber portions formed on both sides of the female connector, wherein coupling portions, to which the male connectors are coupled, are provided on both sides of the female connector, and tool holes are formed in the coupling portions to allow a tool to be inserted thereinto to release coupling with the male connectors.

The locking member may provide an elastic force in a direction perpendicular to an axial direction of the female connector while the beads are caught.

The locking member may include a locking body having a through hole through which the male connector passes, and elastic parts protruding from a lower portion of the locking body and providing the elastic force while in contact with an inner circumferential surface of the female connector.

The elastic parts may extend downward from both sides of a lower portion of the locking body and have a leg shape having front ends extending and curved to face each other.

The tool holes may have fastening protrusions on which hooks protruding from both sides of the elastic parts are caught.

A guide surface, on which the bead may slide when the male connector is coupled, may be obliquely formed inside the locking body.

The guide surface may be obliquely formed upward from a front side toward a rear side of the locking body.

The fastening protrusions, on which ends of the male connectors are caught when the male connectors are coupled, may be provided in an axial hole of the female connector.

Advantageous Effects

According to an embodiment of the present invention, the man-hours for connection and separation between a female connector and male connectors, which constitute a connector, can be reduced, and pipes can be easily connected by connecting the male connectors with both sides of the female connector.

Also, according to an embodiment of the present invention, a separate component for fixing an O-ring is not required in the female connector by having the O-ring in a male connector, thereby reducing the number of components and lowering costs.

Also, according to an embodiment of the present invention, damage to a coupling portion caused by an external force while the connector is coupled can be prevented.

Also, according to an embodiment of the present invention, the locking member is easily separated and connected, thereby improving the assembly efficiency of products.

DESCRIPTION OF DRAWINGS

FIG. 1 is an exploded perspective view showing a pipe connector according to an embodiment of the present invention.

FIG. 2 is an exploded perspective view showing a rear surface of a locking member of the pipe connector according to the embodiment of the present invention.

FIG. 3 is a view showing a front surface of the locking member of the pipe connector according to the embodiment of the present invention.

FIG. 4 is a view showing a coupling state of the pipe connector according to the embodiment of the present invention.

FIG. 5 is a longitudinal cross-sectional view of the pipe connector shown in FIG. 4.

FIG. 6 is a longitudinal cross-sectional view showing a state in which coupling of the locking member is released in the pipe connector according to an embodiment of the present invention.

FIG. 7 is a view showing a portion at which stress is concentrated on the locking member of the pipe connector according to the embodiment of the present invention.

FIG. 8 is a view showing a coupling state of the pipe connector according to another embodiment of the present invention.

MODES OF THE INVENTION

Since the present invention may undergo various modifications and have several embodiments, specific embodiments will be illustrated in the drawings and described in detail. However, this is not intended to limit the invention to specific forms, and it should be understood to include all modifications, equivalents, and alternatives that fall within the spirit and scope of the invention as defined by the claims. In the description of embodiments of the present invention, when it is determined that a specific detailed description of the related art may obscure the gist of the present invention, the detailed description thereof will be omitted.

Although the terms "first," "second," etc. may be used herein to describe various elements, it should be understood that these elements are not limited by the terms. The terms are only used to distinguish one element from another.

Terms used in this application are intended to describe particular embodiments only and are not intended to limit the scope of the invention. Singular expressions include plural expressions unless the context clearly dictates otherwise. In this application, terms such as "include" and "have" indicate the presence of stated features, numbers, steps, operations, components, parts, or combinations thereof, but do not preclude the presence or addition of one or more other features, numbers, steps, operations, components, parts, or combinations thereof.

Furthermore, throughout this specification, when an element is referred to as being "connected to" another element, it is not limited to the two elements being directly connected, and it can also include indirect connections through one or more other elements, both physically and electrically. Additionally, it may refer to elements that are integrally connected, even if they are referred to by different names based on their position or function.

Hereinafter, embodiments of a manifold refrigerant module according to the present invention will be described in detail with reference to the accompanying drawings. In the description with reference to the drawings, the same or corresponding components are assigned the same reference numbers, and redundant explanations thereof will be omitted.

FIG. 1 is an exploded perspective view showing a pipe connector according to an embodiment of the present invention, FIG. 2 is an exploded perspective view showing a rear surface of a locking member of the pipe connector according to the embodiment of the present invention, and FIG. 3 is a view showing a front surface of the locking member of the pipe connector according to the embodiment of the present invention.

As shown in the drawings, the pipe connector according to the embodiment of the present invention may include a female connector 10, male connectors 20 coupled to both sides of the female connector 10 and having beads 24 protruding from outer surfaces thereof, and locking members 30 which allow the beads 24 to be caught on one surfaces thereof by moving on chamber portions 18 when the male connectors 20 are coupled while the locking members 30 are pre-coupled to the chamber portions 18 formed on both sides of the female connector 10. In a state in which the locking members 30 are coupled to both sides of the female connector 10 coupled to the locking member 30, the locking members 30 allow the beads 24 to be caught on one surfaces thereof and provide an elastic force in a direction perpendicular to an axial direction of the female connector 10 while the beads 24 are caught.

The female connector 10 is formed in a pipe shape and has an axial hole 12 formed in an axial direction, into which the male connector 20 is inserted and coupled. Coupling portions 14 are provided on both sides of the female connector 10, and the male connectors 20 are coupled to the female connector 10 in both directions. The coupling portion 14, which is a portion at which the male connector 20 and the locking member 30 are substantially coupled, is integrally formed with the female connector 10. Referring to FIG. 5, a catching protrusion 13 may be provided in a center of the axial hole 12, allowing one end portion of the male connector 20 to be caught when the male connector 20 is coupled. The catching protrusion 13 may protrude from the axial hole 12 in a ring shape in a circumferential direction.

Referring again to FIGS. 1 to 3, the coupling portions 14 may be formed on both sides of the female connector 10 and have a diameter relatively larger than a central portion. Further, the coupling portion 14 includes a tool hole 16 into which a tool is inserted to release the coupling with the male connector 20. The tool hole 16 may be formed along an outer circumferential surface of the female connector 10 in a predetermined width. The tool hole 16 may have a size sufficient to allow a tool to be inserted, and two tool holes 16 may be formed on one sides of the coupling portions 14 at a predetermined interval, allowing both blades of pliers used in the exemplary embodiment to be inserted into the tool holes 16.

A fastening protrusion 17 is formed at an upper end of the tool hole 16 in a stepped manner, allowing a hook 42 of the locking member 30 to be caught. The hook 42 is caught by the fastening protrusion 17, so the locking member 30 and the female connector 10 are ultimately coupled.

As described above, the hook 42 of the coupled locking member 30 is positioned on the fastening protrusion 17 of the tool hole 16. In a state in which both blades of the pliers are inserted into the tool holes 16, an operator presses the hook 42 to release the coupling of the locking member 30. As will be described below, the hook 42 is caught by the fastening protrusion 17 to complete the final coupling of the locking member 30. To release the coupling, first, the coupling of the fastening protrusion 17 of the hook 42 should be released. In this case, as described above, the operator releases the coupling of the hook 42 using a tool such as pliers. In the exemplary embodiment, the tool hole 16 into which the tool is inserted is formed on the coupling portion 14, allowing the locking member 30 to be easily coupled or released, thereby improving the assembly efficiency of the product. Also, in the case of failure of the locking member 30, only the locking member 30 may be removed and replaced, and the female connector 10 and the male connector 20 can be reused without any change.

Meanwhile, the chamber portion 18, which is a portion into which the locking member 30 is inserted when the locking member 30 is coupled, is formed on one side of the coupling portion 14. The chamber portion 18, which is a portion for the insertion of the locking member 30, has a shape corresponding to an outer surface of the locking member 30. The chamber portion 18 is open from the top to bottom of the coupling portion 14, and the locking member 30 is inserted through the chamber portion 18 and pre-coupled to the female connector 10. The chamber portion 18 may have an opening with a predetermined width at the top of the coupling portion 14 in a circumferential direction. When the male connector 20 is coupled, the locking member 30 moves upward and downward within the chamber portion 18, allowing the male connector 20 to be coupled to or released from the female connector 10.

The male connectors 20 may be coupled to both sides of the female connector 10. The male connector 20 is formed in a pipe shape like the female connector 10 and has an axial hole 22 formed in an axial direction to allow a refrigerant to flow. The male connector 20 has a diameter smaller than the female connector 10 and is inserted into and coupled to the axial hole 12 of the female connector 10. In the embodiment of the present invention, since the male connectors 20 are coupled to both sides of the female connector 10 in both directions, pipes or hoses may be coupled to the male connectors 20, and thus the scope of application can be widened.

The bead 24 for coupling with the female connector 10 and the locking member 30 is provided on an outer circumferential surface of the male connector 20. The bead 24 protrudes from the outer circumferential surface of the male connector 20 to be caught on one surface, that is, a rear surface, of the locking member 30, allowing the male connector 20 to be fixed in an axial direction.

Further, an O-ring 26 is provided on an outer circumferential surface of the male connector 20 to facilitate sealing when the male connector 20 is coupled with the female connector 10. At least one O-ring 26 may be provided on the outer circumferential surface of the male connector 20 at a predetermined interval. In the exemplary embodiment, the O-ring 26 is disposed closer to the female connector 10 than the bead 24 and performs sealing. When the O-ring 26 is provided on the female connector 10 instead of the male connector 20, a separate component, such as a spacer or a retainer, for fixing a position of the O-ring 26 is required. In the exemplary embodiment, since the O-ring 26 is provided on the male connector 20, the number of components of the male connector 20 can be reduced, and costs can be lowered.

Referring to FIGS. 2 and 3, the locking member 30 may include a locking body 32, having a through hole 34 through which the male connector 20 passes, and an elastic part 40 which protrudes from a lower portion of the locking body 32 and comes into contact with an inner circumferential surface of the female connector 10 to provide an elastic force.

The locking member 30 may be inserted into and coupled to the chamber portion 18, which is formed in the female connector 10, from top to bottom. Since the locking body 32 is coupled to the male connector 20 while pre-coupled to the female connector 10, the locking body 32 has an approximate ring shape for the insertion of the male connector 20. A mounting groove 38, in which a reinforcement plate 50 is mounted, is formed on one surface, that is a rear surface, of the locking body 32.

Further, a guide surface 36 is obliquely formed inside the locking body 32, that is one side of the through hole 34, allowing the bead 24 to slide when the male connector 20 is coupled. The guide surface 36 may be formed in a predetermined length rearward from the front surface of the locking body 32 and is inclined upward in a rear direction, allowing the bead 24 to be smoothly slide. The bead 24 slides along the guide surface 36 and is caught on one surface, that is a rear surface, of the locking body 32, allowing the male connector 20 to be coupled in the axial direction. In this case, the bead 24 may be caught by a locking protrusion 44 protruding from a rear surface of the locking body 32.

The elastic parts 40 may extend from both sides of a lower portion of the locking body 32 downward. The elastic part 40 may be formed of an elastically deformable material, such as synthetic resin and have a leg shape having front ends extending and curved to face each other. Due to this shape, when an external force is applied to the elastic parts

40 in a vertical direction (from top to bottom), the elastic parts 40 can be pressed while elastically deformed to face each other.

The hooks 42 protrude from both sides of the elastic parts 40 to be caught by the fastening protrusions 17 formed on both sides of the female connector 10. The hook 42, which is a portion for coupling with the female connector 10, stops upward movement when caught by the fastening protrusion 17. In the drawings, the hooks 42 are provided on both sides of the elastic parts 40 but are not limited thereto. The hooks 42 may be provided on both sides of the locking body 32. Also, the bead 24 is caught by the locking protrusion 44, and the locking protrusion 44 is a portion for coupling the male connector 20.

A plurality of reduction portions 46 are formed on one surface, that is, a front surface, of the locking body 32, and a compressing hole 48 for compressing during insert molding may be formed in at least part of the reduction portion 46.

Meanwhile, the reinforcement plate 50 may be mounted in a mounting groove 38 formed on one surface of the locking body 32. The reinforcement plate 50, which is provided to reinforce the rigidity of the locking body 32 made of synthetic resin, may be made of a metal material and manufactured with the locking member 30 through insert molding. The reinforcement plate 50 has an approximate ring shape to correspond to the shape of the locking body 32, and position fixing portions 52 may protrude from both sides of the reinforcement plate 50 to fix the position in the mounting groove 38.

Referring to FIG. 7, when the refrigerant flows while the locking member 30 is coupled to the female connector 10, stress may be concentrated on a lower portion (stress concentration area) of the locking member 30. The bead 24, at which stress is concentrated, may be crushed or damaged by the stress, and a contact surface of the locking member 30 may be damaged.

In the exemplary embodiment, to solve the above problems, the reinforcement plate 50, which is made of a metal material, may be inserted into one surface of the locking body 32, thereby preventing damage to the contact surface of the locking member 30 and the bead 24, which is made of a synthetic material.

Generally, the pipe connector may be used at both low pressure and high pressure, and in the embodiment, the reinforcement plate 50 may be applied according to the pressure. To describe in more detail, when the connector is used at high pressure, the reinforcement plate 50 is inserted to be used. When the connector is used at low pressure, only the locking body 32 is used without the insertion of the reinforcement plate 50. When the connector is used at high pressure, the reinforcement plate 50 is used, thereby preventing damage to the contact surface of the bead 24 and the locking member 30. Meanwhile, since the contact surface of the bead 24 and the locking member 30 is not damaged without the reinforcement plate 50 when the connector is used at low pressure, the reinforcement plate 50 may not be inserted. Therefore, since the reinforcement plate 50 is not inserted when the connector is used at low pressure, component costs can be reduced.

FIG. 4 is a view showing a coupling state of the pipe connector according to the embodiment of the present invention, FIG. 5 is a longitudinal cross-sectional view of the pipe connector shown in FIG. 4, and FIG. 6 is a longitudinal cross-sectional view showing a state in which coupling of the locking member is released in the pipe connector according to an embodiment of the present invention.

Referring to FIGS. 4 and 5, to couple the pipe connector, first, the locking member 30 is inserted from top to bottom through the chamber portion 18 of the female connector 10 and is pre-coupled. In this state, to couple the male connectors 20, the male connectors 20 may be inserted into both sides of the female connector 10.

In a process of inserting the male connector 20, the bead 24 slides along the guide surface 36, and the locking member 30 is pressed downward while being elastically supported by the insertion force of the male connector 20. The locking member 30 is elastically supported by the elastic parts 40. The elastic parts 40 are supported while being elastically deformed downward, and the hook 42 is caught by the fastening protrusion 17.

When the bead 24 is caught by the rear surface of the locking member 30, that is, the locking protrusion 44, the male connector 20, which slides along the guide surface 36, may be coupled to the female connector 10. In this case, the O-ring 26 of the male connector 20 comes into contact with an inner circumferential surface of the female connector 10 to maintain a sealed state.

Pipes, hoses, or the like may be easily connected to both sides of the finally coupled male connectors 20. Also, the finally coupled pipe connectors have an advantage in which separate processes, such as swaging and heat welding, are not required at an end of the female connector 10.

Referring to FIG. 6, for an operator to release the male connectors 20 for maintenance, first, the coupling of the locking member 30 should be released. To release, the operator presses the top of the locking member 30 as shown in the drawing, and the coupling of the bead 24 and the locking protrusion 44 is released. In this state, when the operator moves the male connectors 20 in both directions, the male connectors 20 may be easily separated from the female connector 10 without interference with the locking member 30.

As described above, in the exemplary embodiment, the female connector 10 and the male connector 20 are easily coupled and separated through the locking member 30, thereby enhancing product convenience.

FIG. 8 is a view showing a coupling state of the pipe connector according to another embodiment of the present invention. In this drawing, components identical to those in the above-mentioned embodiment are assigned reference numerals in the 100*s*, and descriptions thereof will be omitted for convenience.

Referring to this, a configuration in which male connectors 120 are coupled to both sides of a female connector 110 has been described in the above-described exemplary embodiment. According to the exemplary embodiment, since three portions extend not only from both sides of the female connector 110 but also from the top thereof, the male connectors 120 may be coupled to the three portions. That is, the female connector 110 may be T-shaped and branched off into the three portions.

In the case of vehicles equipped with a refrigerant pipe connector, some vehicles may have pipes branched off into three portions. When the connector is applied to this pipe shape, the inconvenience of separating the entire piping when the internal components are replaced can be reduced. That is, when air conditioning units, expansion vales, or the like, mounted in the vehicles, are replaced, only the pipe connected with the male connector 120 is separated, thereby increasing maintenance efficiency.

Also, although not shown in the exemplary embodiment, the female connector 110 may be formed in not only a straight or T shape but also in a partially bent form with an angle of 90°, 120°, or the like depending on the connection angle of the pipe.

While the present invention has been described above with reference to specific exemplary embodiments, it will be understood by those skilled in the art that various modifications and changes can be made to the present invention without departing from the spirit and scope thereof as set forth in the following claims.

| [Descriptions of Symbols] | |
|---|---|
| 10: FEMALE CONNECTOR | 12: AXIAL HOLE |
| 13: CATCHING PROTRUSION | 14: COUPLING PORTION |
| 16: TOOL HOLE | 17: FASTENING PROTRUSION |
| 18: CHAMPER PORTION | 20: MALE CONNECTOR |
| 22: AXIAL HOLE | 24: BEAD |
| 26: O-RING | 30: LOCKING MEMBER |
| 32: LOCKING BODY | 34: THROUGH HOLE |
| 36: GUIDE SURFACE | 38: MOUNTING GROOVE |
| 40: ELASTIC PART | 42: HOOK |
| 44: LOCKING PROTRUSION | 50: REINFORCEMENT PLATE |
| 52: POSITION FIXING PORTION | |

The invention claimed is:

1. A pipe connector comprising:

a female connector;

male connectors connected to both sides of the female connector and having beads protruding from outer circumferential surfaces thereof; and locking members which allow the beads to be caught on one surfaces thereof by moving on chamber portions when the male connectors are coupled while the chamber portions formed on both sides of the female connector are pre-coupled to both sides of the female connector, wherein the locking member is formed of a synthetic material, and a metal reinforcement plate is coupled to the one surface of the locking member on which the bead is caught, wherein a fastening protrusion, on which one end of the male connector is caught when the male connector is coupled, is provided in an axial hole of the female connector.

2. The pipe connector of claim 1, wherein the locking members provide an elastic force in a direction perpendicular to an axial direction of the female connector while the beads are caught.

3. The pipe connector of claim 2, wherein the locking member includes:

a locking body having a through hole through which the male connector passes; and elastic parts protruding from a lower portion of the locking body and providing the elastic force while in contact with an inner circumferential surface of the female connector.

4. The pipe connector of claim 3, wherein the elastic parts extend downward from both sides of the lower portion of the locking body and have a leg shape having front ends extending and curved to face each other.

5. The pipe connector of claim 3, wherein the reinforcement plate is mounted in a mounting groove formed by recessing one surface of the locking body.

6. The pipe connector of claim 5, wherein the reinforcement plate is integrally formed with the locking body through insert molding.

7. The pipe connector of claim 6, wherein the locking body includes a reduction portion, and the reduction portion includes a compressing hole for compressing during insert molding.

8. The pipe connector of claim 3, wherein the locking body includes a locking protrusion on which the bead is caught.

9. The pipe connector of claim 3, wherein a guide surface, on which the bead slides when the male connector is coupled, is obliquely formed inside the locking body.

10. The pipe connector of claim 9, wherein the guide surface is obliquely formed upward from a front side toward a rear side of the locking body.

11. A pipe connector comprising:

a female connector;

male connectors connected to both sides of the female connector and having beads protruding from outer circumferential surfaces thereof; and locking members which allow the beads to be caught on one surfaces thereof by moving on chamber portions when the male connectors are coupled while the chamber portions formed on both sides of the female connector are pre-coupled to both sides of the female connector, wherein the locking member is formed of a synthetic material, and a metal reinforcement plate is coupled to the one surface of the locking member on which the bead is caught, wherein the locking members provide an elastic force in a direction perpendicular to an axial direction of the female connector while the beads are caught, wherein the locking member includes:

a locking body having a through hole through which the male connector passes; and elastic parts protruding from a lower portion of the locking body and providing the elastic force while in contact with an inner circumferential surface of the female connector, and wherein hooks protrude from both sides of the elastic part and are caught by fastening protrusions formed on both sides of the female connector.

12. A pipe connector comprising:

a female connector;

male connectors coupled to both sides of the female connector and having beads protruding from outer circumferential surfaces thereof; and locking members which allow the beads to be caught on one surfaces thereof by moving on chamber portions when the male connectors are coupled while pre-coupled to the chamber portions formed on both sides of the female connector, wherein coupling portions, to which the male connectors are coupled, are provided on both sides of the female connector, and tool holes are formed in the coupling portions to allow a tool to be inserted thereinto to release coupling with the male connectors.

13. The pipe connector of claim 12, wherein the locking member provides an elastic force in a direction perpendicular to an axial direction of the female connector while the beads are caught.

14. The pipe connector of claim 13, wherein the locking member includes:

a locking body having a through hole through which the male connector passes; and elastic parts protruding from a lower portion of the locking body and providing the elastic force while in contact with an inner circumferential surface of the female connector.

15. The pipe connector of claim 14, wherein the elastic parts extend downward from both sides of the lower portion of the locking body and have a leg shape having front ends extending and curved to face each other.

16. The pipe connector of claim 14, wherein the tool holes have fastening protrusions on which hooks protruding from both sides of the elastic parts are caught.

17. The pipe connector of claim 14, wherein a guide surface, on which the bead slides when the male connector is coupled, is obliquely formed inside the locking body.

18. The pipe connector of claim 17, wherein the guide surface is obliquely formed upward from a front side toward a rear side of the locking body.

19. The pipe connector of claim 12, wherein a fastening protrusion, on which one end of the male connector is caught when the male connector is coupled, is provided in an axial hole of the female connector.

* * * * *